No. 615,930. Patented Dec. 13, 1898.
S. G. WARREN.
TOP SPINNER.
(Application filed Apr. 14, 1898.)
(No Model.)

Witnesses
Harry L. Amer.
C. N. Walker

Inventor
Stephen G. Warren.
by O. S. Stockbridge.
his Attorney.

THE NORRIS PETERS CO., PHOTO-LITHO., WASHINGTON, D. C.

UNITED STATES PATENT OFFICE.

STEPHEN G. WARREN, OF ATTICA, NEW YORK.

TOP-SPINNER.

SPECIFICATION forming part of Letters Patent No. 615,930, dated December 13, 1898.

Application filed April 14, 1898. Serial No. 677,618. (No model.)

*To all whom it may concern:*

Be it known that I, STEPHEN G. WARREN, a citizen of the United States, residing at Attica, in the county of Wyoming and State of New York, have invented certain new and useful Improvements in Top-Spinners; and I do hereby declare the following to be a full, clear, and exact description of the invention, such as will enable others skilled in the art to which it appertains to make and use the same.

This invention has reference to a novel construction in a top-spinning device, the object being to provide a simple and inexpensive contrivance that can be employed to spin a top with ease and force.

The invention consists in the features of construction hereinafter described and specifically claimed.

Figure 1:
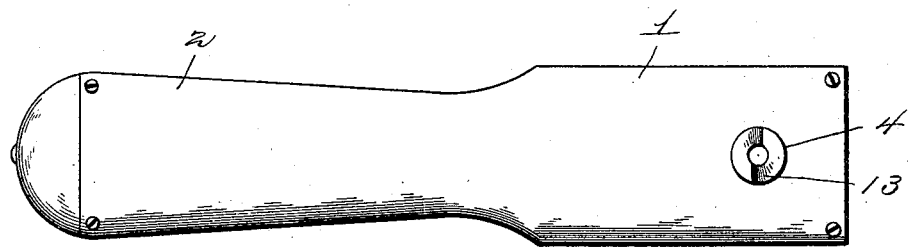
Figure 2:
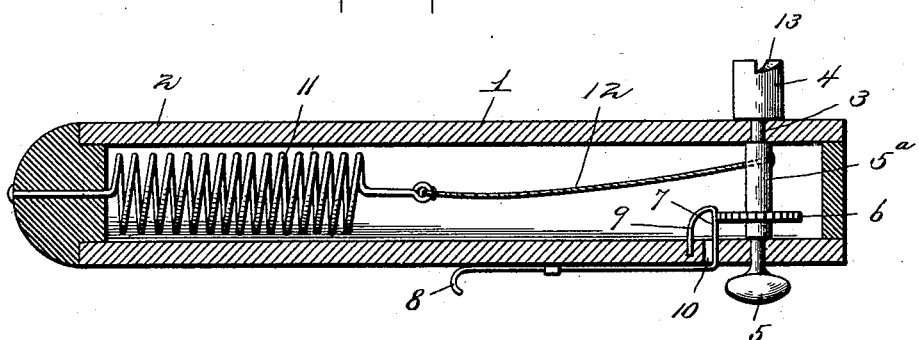
Figure 3:
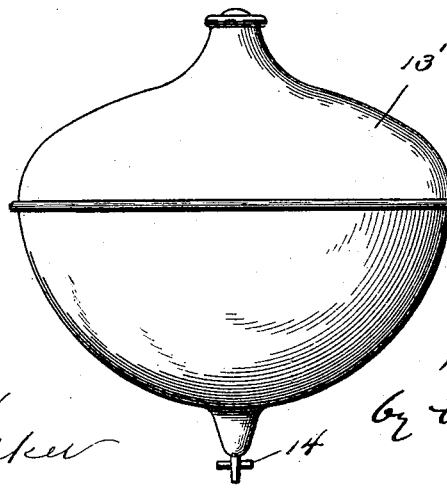

In the accompanying drawings, forming a part of this specification, Figure 1 is a plan view of a top-spinning device constructed in accordance with my invention. Fig. 2 is a central vertical section of the same. Fig. 3 is a side elevation of the top.

Referring now to said drawings, 1 indicates a casing with one end formed into a handle 2. Near the other end of the casing is a rotatable shaft 13, that extends on both sides of the casing and is provided at one end with a head 4 and at its other end with a key or handle 5. Between the sides of the casing said shaft is provided with the drum portion $5^a$ and a toothed wheel 6. Situated close to said wheel is a spring-actuated trigger 7, that extends outside of said casing and is provided with a handle 8. The said trigger is conveniently formed of one piece of spring-wire having its end portion 9 bent backwardly and secured to the side of the casing, while the trigger portion 7 extends through a slot 10 in the side of the casing. In the handle portion of the casing is a spring 11, secured at its rear end to the end of the handle, while its other end is connected with a string or cord 12, that is also connected with a winding-drum 5.

The head 4 is provided with oppositely-located notches at its upper end, as shown at 13, one wall of the notch being upright, while the other is inclined or grooved.

I have also shown a top 13', which is adapted to be spun by this device, the pivot of the top having a cross-piece 14 to rest within the notches 13 of the head 4.

In operation the winding-drum is turned by means of the key until the cord 12 is wound thereon and is then held in this position by the trigger 7. The top is then placed within the head with the cross-piece 14 resting within the notches, and upon retracting the trigger 7 by means of the handle 8 the spring 11 exerts its force upon the shaft 5 and turns the latter rapidly and likewise the top. When the shaft stops, it is obvious that the motion of the top will continue, and the latter rises from the socketed head by reason of the inclined walls of the slot in an obvious manner.

Having thus described my invention, what I claim as new and desire to secure by Letters Patent, is—

In a top-spinner a casing or hollow handle, a rotatable shaft having a notched head and winding-key extending laterally through the casing, a toothed wheel and drum upon said shaft within the casing, a cord connected with said winding-drum, a spring connected with said cord, a trigger extending through a slot in the casing of said spinner and provided with a handle, and a spring connected with said trigger and serving to hold the trigger normally in engagement in said toothed wheel.

In testimony whereof I affix my signature in presence of two witnesses.

STEPHEN G. WARREN.

Witnesses:
  GEO. E. FAUTH,
  G. P. STEDMAN.